United States Patent
Tong et al.

(10) Patent No.: US 12,273,198 B2
(45) Date of Patent: Apr. 8, 2025

(54) WIRELESS COMMUNICATION METHOD, ELECTRONIC DEVICE AND STORAGE MEDIUM

(71) Applicant: TP-LINK CORPORATION LIMITED, Hong Kong (CN)

(72) Inventors: Di Tong, Shenzhen (CN); Wanyi Li, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/571,209

(22) PCT Filed: Jan. 10, 2023

(86) PCT No.: PCT/CN2023/071714
§ 371 (c)(1),
(2) Date: Dec. 15, 2023

(87) PCT Pub. No.: WO2023/134694
PCT Pub. Date: Jul. 20, 2023

(65) Prior Publication Data
US 2024/0283569 A1    Aug. 22, 2024

(30) Foreign Application Priority Data
Jan. 11, 2022  (CN) .......................... 202210027422.2

(51) Int. Cl.
*H04L 1/00* (2006.01)
*H04B 17/327* (2015.01)
*H04L 5/00* (2006.01)

(52) U.S. Cl.
CPC ......... *H04L 1/0083* (2013.01); *H04B 17/327* (2015.01); *H04L 5/0048* (2013.01)

(58) Field of Classification Search
CPC .... H04B 17/327; H04L 1/0083; H04L 5/0048
See application file for complete search history.

(56) References Cited

U.S. PATENT DOCUMENTS

| | | | |
|---|---|---|---|
| 2006/0079183 A1* | 4/2006 | Song | H04W 16/16 455/63.1 |
| 2016/0135225 A1* | 5/2016 | Kwon | H04W 74/0808 370/329 |

(Continued)

FOREIGN PATENT DOCUMENTS

| CN | 108012288 A | 5/2018 |
|---|---|---|
| CN | 114513283 | 5/2022 |

OTHER PUBLICATIONS

Written Opinion and International Search report for PCT/CN2023/071714, dated Apr. 6, 2023, 8 pages.

(Continued)

*Primary Examiner* — Albert Decady
*Assistant Examiner* — Enamul M Kabir
(74) *Attorney, Agent, or Firm* — Loeb & Loeb LLP (57) ABSTRACT

Disclosed in the present invention are a wireless communication method, an electronic device and a storage medium. The method includes: determining an adjacent communication entity around an STA on the basis of a received OBSS PPDU; and reporting information of the determined adjacent communication entity to an AP, wherein the reported information of the adjacent communication entity is used by the AP to select a transmission object. In the embodiments of the present invention, when a spatial reuse mechanism is implemented, an AP can select a transmission object according to address information of an OBSS PPDU(s) that is reported by an STA associated with the AP, thereby avoiding a communication failure or efficiency reduction caused by blind transmission.

20 Claims, 4 Drawing Sheets

---

S1: determining one or more adjacent communication entities around the STA, based on received Overlapping Basic Service Set (OBSS) Physical Layer Protocol Data Unit (PPDU) (OBSS PPDU)

S2: reporting information of the determined one or more adjacent communication entity to the AP, wherein, the reported information of the one or more adjacent communication entity is used for the AP to select a transmission object (56) References Cited

U.S. PATENT DOCUMENTS

| | | | |
|---|---|---|---|
| 2016/0242210 A1* | 8/2016 | Seok | H04W 74/0808 |
| 2017/0346608 A1 | 11/2017 | Li et al. | |
| 2017/0374682 A1 | 12/2017 | Jiang et al. | |
| 2018/0139635 A1* | 5/2018 | Oteri | H04W 74/0808 |
| 2018/0176921 A1* | 6/2018 | Cariou | H04W 72/541 |
| 2018/0184285 A1* | 6/2018 | Patil | H04L 61/5038 |
| 2019/0141749 A1* | 5/2019 | Seok | H04W 72/0473 |
| 2019/0191377 A1 | 6/2019 | Park et al. | |
| 2019/0200387 A1* | 6/2019 | Chitrakar | H04W 28/20 |
| 2019/0208423 A1* | 7/2019 | Cherian | H04W 48/10 |
| 2019/0313328 A1 | 10/2019 | Ma | |
| 2019/0327741 A1 | 10/2019 | Li et al. | |
| 2020/0084803 A1* | 3/2020 | Kim | H04W 8/26 |
| 2021/0153026 A1 | 5/2021 | Katabathuni | |
| 2021/0297865 A1* | 9/2021 | Cherian | H04W 74/06 |
| 2021/0410048 A1* | 12/2021 | Yu | H04W 48/14 |
| 2022/0007196 A1* | 1/2022 | Ko | H04W 52/146 |
| 2022/0338066 A1* | 10/2022 | Chitrakar | H04W 72/541 |
| 2023/0009996 A1* | 1/2023 | Ciochina | H04W 52/367 |

OTHER PUBLICATIONS

English translation of International Search Report for PCT/CN2023/071714, dated Apr. 6, 2023, 2 pages.

English transltion of Written Opinion for PCT/CN2023/071714, dated Apr. 6, 2023, 2 pages.

* cited by examiner

WIRELESS COMMUNICATION METHOD, ELECTRONIC DEVICE AND STORAGE MEDIUM

CROSS-REFERENCE TO RELATED APPLICATIONS

The present application is a U.S. national phase of PCT international application PCT/CN2023/071714, filed on Jan. 10, 2023, which further claims the priority of China Patent Application No. 202210027422.2 filed on Jan. 11, 2022, and the contents of the above-mentioned applications are hereby incorporated in their entirety as a part of the present disclosure.

TECHNICAL FIELD

The present disclosure belongs to a field of network technology, and more particularly, to a wireless communication method, an electronic device, and a storage medium.

BACKGROUND

Figure 1:
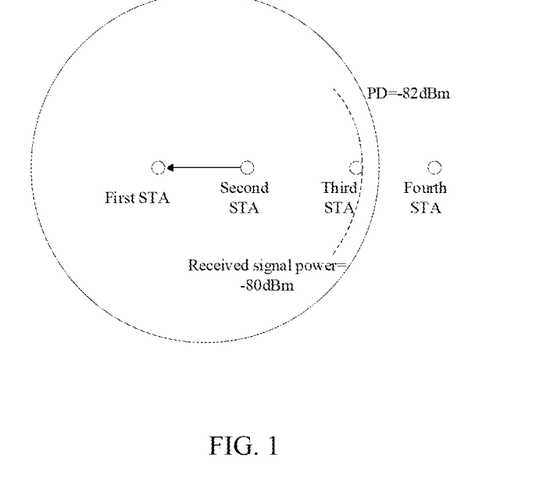
FIG. 1 is a first application scenario of the prior art.

With respect to traditional Packet detection (PD), as long as a valid WIFI signal with a signal energy above −82 dBm is detected, transmission thereof will be delayed. As shown in FIG. 1, a third STA receives a Physical-layer Protocol Data Unit (PPDU) sent by a second STA of an Overlapping Basic Service Set (OBSS), with a received signal power of −80 dBm, which is greater than its PD threshold of −82 dBm, then the third STA will determine that the channel is busy and delay transmission thereof. This may result in decrease in overall throughput for dense user scenarios.

To address the problem, 802.11ax introduces spatial reuse technology, which may dynamically adjust the PD threshold to obtain a higher probability of transmission opportunities. The spatial reuse mechanism may increase network throughput, but in the process of spatial reuse, more attention is paid to whether the power of the received OBSS PPDU is below the dynamically adjusted packet detection threshold, that is, whether the OBSS PPDU transmission may be ignored so as to perform transmission within the Basic Service Set (BSS), but less attention is paid to how to better select a transmission object after ignoring the OBSS PPDU transmission.

SUMMARY

The present disclosure is intended to solve one of technical problems in the related technology at least to a certain extent. To this end, a purpose of the present disclosure is to propose a wireless communication method, an apparatus, an electronic device and a storage medium.

In order to solve the above-described technical problems, embodiments of the present disclosure provide technical solutions below:

Firstly, an embodiment of the present disclosure provides a wireless communication method applied to an STA, the method including: determining an adjacent communication entity around the STA, based on received Overlapping Basic Service Set (OBSS) Physical Layer Protocol Data Unit (PPDU) (OBSS PPDU); and reporting information of the determined adjacent communication entity to the AP, wherein, the reported information of the adjacent communication entity is used for the AP to select a transmission object.

Optionally, the step of determining an adjacent communication entity around the STA based on received OBSS PPDU, comprises: after receiving an OBSS PPDU, comparing, by the STA, a received signal power of the OBSS PPDU with a preset threshold; and acquiring, by the STA, address information of the OBSS PPDU as information of the adjacent communication entity around the STA, if the received signal power is greater than the preset threshold.

Optionally, the step of reporting the information of the determined an adjacent communication entity to the AP, comprises: reporting, by the STA, address information of the OBSS PPDU(s) acquired within a preset time to the AP, wherein, the STA reports the address information of the OBSS PPDU(s) to the AP in a format of event report frame, or, the STA reports the address information of the OBSS PPDU(s) to the AP in a format of HT Control variant.

Optionally, the step of acquiring, by the STA, address information of the OBSS PPDU, if the received signal power is greater than the preset threshold, comprises: acquiring, by the STA, featured bits of the address information of the OBSS PPDU, if the received signal power is greater than the preset threshold.

Optionally, the event report frame includes: a single event report element, wherein, the single event report element at least comprises: an Element ID field and an Event Report field.

Optionally, the Event Report field includes the address information of the OBSS PPDU(s) acquired by the STA.

Optionally, the single event report element further comprises: a Length field, an Event Token field, an Event Type field, and an Event Report Status field.

Optionally, the HT Control variant comprises: a Control ID field, a Control Information field and a Padding subfield.

Optionally, the first bit of the Control Information field is used to indicate whether there is still a Control Information field to be read in the information reported by the STA to the AP.

Optionally, the address information field of the Control Information field includes the address information of the OBSS PPDU(s) acquired by the STA, where, the number n of address information fields is 1≤n≤3.

Optionally, the Padding subfield is set to a 0 sequence.

Optionally, when the STA reports the address information of the OBSS PPDU(s) acquired within preset time to the AP, the AP receives another OBSS PPDU, and acquires address information of the other OBSS PPDU. When the AP ignores the received other OBSS PPDU based on the spatial reuse mechanism, the AP searches the address information of the OBSS PPDU(s) for the address information of the other OBSS PPDU, and if the address information of the other OBSS PPDU is searched, the AP will not take the STA as the transmission object.

In a second aspect, an embodiment of the present disclosure provides a wireless communication method applied to an AP, the method comprising: acquiring Overlapping Basic Service Set (OBSS) Physical Layer Protocol Data Unit (PPDU) (OBSS PPDU) transmission and information on a transmitter of the OBSS PPDU transmission; acquiring information on an adjacent communication entity of a first communication entity associated with the AP from the first communication entity, the adjacent communication entity comprising a second communication entity; and selecting a communication entity within a Basic Service Set (BSS) of the AP except for the first communication entity as a transmission object, when the transmitter of the OBSS PPDU transmission is the second communication entity, in a case where the received OBSS PPDU transmission is determined to be ignored based on a spatial reuse mechanism.

Optionally, the information on the adjacent communication entity of the first communication entity is reported to the AP by the first communication entity in a format of event report frame or in a format of HT Control variant.

Optionally, wherein, the event report frame comprises: a single event report element, wherein, the single event report element at least comprises: an Element ID field and an Event Report field, and wherein, the Event Report field comprises the address information of the adjacent communication entity of the first communication entity.

Optional, wherein, the HT Control variant includes: a Control ID field, a Control Information field and a Padding subfield, wherein, an address information field of the Control Information field comprises the address information of the adjacent communication entity of the first communication entity.

In a third aspect, an embodiment of the present disclosure further provides a wireless communication apparatus, including:
- a receiving module, configured to determine an adjacent communication entity around the STA, based on received Overlapping Basic Service Set (OBSS) Physical Layer Protocol Data Unit (PPDU) (OBSS PPDU); and
- a reporting module, configured to report information of the determined adjacent communication entity to the AP, wherein, the reported information of the adjacent communication entity is used for the AP to select a transmission object.

In a fourth aspect, an embodiment of the present disclosure further provides a wireless communication apparatus, including:
- an acquiring module, configured to acquire Overlapping Basic Service Set (OBSS) Physical Layer Protocol Data Unit (PPDU) (OBSS PPDU) transmission and information on the transmitter of the OBSS PPDU transmission, and acquire information on an adjacent communication entity of a first communication entity associated with the AP from the first communication entity, the adjacent communication entity comprising a second communication entity; and
- a selecting module, configured to select a communication entity within a Basic Service Set (BSS) of the AP except for the first communication entity as a transmission object, when the transmitter of the OBSS PPDU transmission is the second communication entity, in a case where the received OBSS PPDU transmission is determined to be ignored based on a spatial reuse mechanism.

In a fifth aspect, an embodiment of the present disclosure further provides an electronic device, including a processor, a memory, and computer program stored in the memory and configured to be executed by the processor, wherein, the processor, when executing the computer program, implements the method as described above.

In a sixth aspect, an embodiment of the present disclosure further provides a computer readable storage medium, including computer program thereon, wherein, the computer program, when executed, controls a device where the computer readable storage medium is located to execute the method as described above.

The embodiments of the present disclosure have technical effects below:

In the above-described technical solution of the present disclosure, when the AP performs the spatial reuse mechanism, the AP may select a transmission object according to the address information of the OBSS PPDU(s) reported by the STA associated therewith to avoid blind transmission that leads to communication failure or reduced efficiency.

In the embodiments of the present disclosure, after the time for the STA to acquire the address information of the OBSS PPDU reaches the preset time, the STA may, voluntarily choose to or based on system allocation, report address information of all the OBSS PPDUs acquired within the preset time to the AP based on a format of event report frame or HT Control variant.

The additional aspects and advantages of the present disclosure will be partially provided in the following description, which will become apparent from the following description, or will be understood through the practice of the present disclosure.

DETAILED DESCRIPTION

The embodiments of the present disclosure will be described in detail below, and examples of the embodiments are shown in the drawings, in which the same or similar reference signs indicate the same or similar components or components having the same or similar functions throughout. The embodiments described below with reference to the drawings are exemplary, which are only intended to explain the present disclosure, and cannot be construed as limitative of the present disclosure.

In order to facilitate understanding of the embodiments by those skilled in the art, some terms are explained:
(1) Spatial reuse: abbreviated as SR, which is a multi-cell parallel transmission method defined by the 802.11ax standard.
(2) 802.11ax: refers to Wi-Fi6 (formerly referred to as IEEE 802.11.ax), which is the sixth-generation wireless network technology.
(3) PPDU: Physical Layer (PHY) Protocol Data Unit, representing a physical layer protocol data unit.
(4) MAC address: Medium Access Control Address.
(5) OBSS: Overlapping Basic Service Set.
(6) QoS: Quality of Service.
(7) HT: High Throughput.
(8) HT Control: high throughput control.

(9) HE: High efficiency.

(10) A-Control: aggregated control, a subfield of the HE variant HT control field.

At present, 802.11ax introduces the spatial reuse technology, which dynamically adjusts the PD threshold to obtain a higher probability of transmission opportunities.

Figure 2:
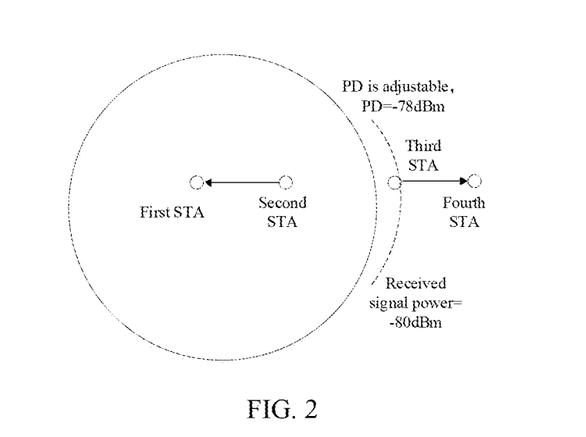
FIG. 2 is a second application scenario of the prior art.

As shown in FIG. 2, a first STA, a second STA, a third STA, and a fourth STA are shown in FIG. 2. Specifically, the third STA receives a PPDU sent by the OBSS second STA, with a received signal power of −80 dBm. However, since a PD threshold of the third STA may be dynamically adjusted, it is assumed as −78 dBm, at this time, the power of the received OBSS PPDU is lower than the PD threshold, then transmission of the second STA may be ignored by the third STA to perform its own transmission.

It may be seen that the spatial reuse mechanism may increase network throughput, but in the process of spatial reuse, more attention is paid to whether a power of the received OBSS PPDU transmission (also referred to as OBSS PPDU herein) is below the dynamically adjusted packet detection threshold, that is, whether the OBSS PPDU transmission may be ignored so as to perform transmission within the BSS, but less attention is paid to how to better select a transmission object after ignoring the OBSS PPDU transmission.

Figure 3:
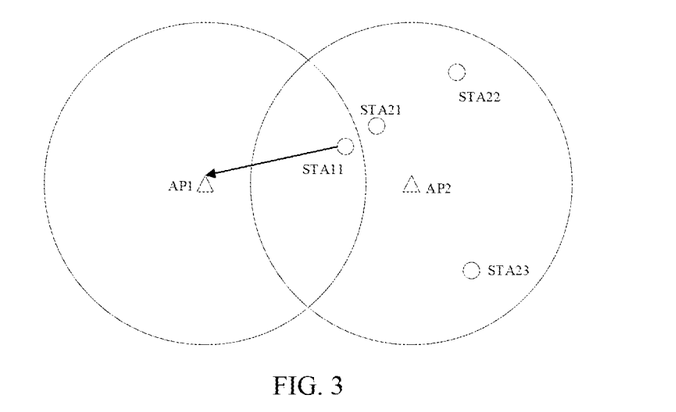
FIG. 3 is a third application scenario of the prior art.

As shown in FIG. 3, STA11 is associated with AP1, while STA21, STA22 and STA23 are associated with AP2. STA21 is very close to STA11.

Assuming that AP2 receives a frame sent by STA11 to AP1 and ignores the frame through spatial reuse, if AP2 sends a frame to STA21, there may be one of cases below:

STA21 is very close to STA11, and the received power, at the STA21, of the frame sent by STA11 is greater than the maximum OBSS PD threshold, that is, after STA21 receives the PPDU sent by STA11, transmission from the STA11 cannot be ignored through spatial reuse, then the frame sent by AP2 to STA21 will conflict with the frame sent by STA11, and communication cannot be continued.

STA21 is very close to STA11, but a power of the frame sent by STA11 and received by STA21 is not greater than a maximum PD threshold, and spatial reuse may be implemented by dynamically adjusting the PD threshold. However, if AP2 sends a frame to STA21, since STA21 is limited by the transmission of the frame from STA11, the transmission power thereof will be limited to a very low level, in which scenario, if AP2 chooses to communicate with STA22 or STA23, it will be significantly better than communication with STA21, and if AP2 chooses to communicate with STA21, efficiency will be significantly reduced.

In order to solve the above-described technical problems, the embodiment of the present disclosure provides a data transmission system based on spatial reuse, including an AP and an STA associated with the AP.

As a specific example, the STA includes a receiver, a detector, and a recorder.

For example, for each STA, a receiver may be used to receive an OBSS PPDU(s) and address information of the OBSS PPDU(s) sent by other STAs or APs. A detector is used to detect and acquire a received signal power of each OBSS PPDU received by the receiver, and then, the detector compares each received signal power with a preset threshold. If the received signal power exceeds the preset threshold, it is indicated that the transmitter (a communication entity STA or an AP) of the received OBSS PPDU is close to the STA, the transmitter will be taken as an adjacent communication entity and a record signal will be sent to a recorder. The recorder will record and acquire address information of the corresponding OBSS PPDU, for example, featured bits. It should be noted that in the context of the present application, the address information of the OBSS PPDU may indicate an address of the transmitter which transmits the OBSS PPDU.

If the received signal power is less than or equal to the preset threshold, that is, it indicates that the transmitter (the communication entity STA or the AP) of the received OBSS PPDU is far away from the STA, and the transmitter is not taken as an adjacent communication entity, then the detector will not send a record signal to the recorder.

Meanwhile, the detector detects each recording period of the recorder and compares a detection result with the preset time. If the detection result is consistent with the preset time, the detector notifies the STA (e.g., a processor or processing unit of the STA) to report the address information of the OBSS PPDU(s) acquired within the preset time to the AP.

After receiving report notification, the STA (e.g., a processor or processing unit of the STA) selects a reporting format (e.g., which is included in an Event Report field or an address information field described later), to report the address information of the OBSS PPDU(s) acquired within the preset time to the AP.

Further, the AP includes an acquirer and an inquirer.

Specifically, the acquirer is used to receive the address information of the OBSS PPDU(s) reported by the STA, and record and store the address information of the OBSS PPDU(s).

When the AP ignores transmission of a certain OBSS PPDU based on spatial reuse, the address information of the OBSS PPDU(s) reported by the STA associated with the AP (e.g., which is includes in the Event Report field or the address information field) as described above is searched. If featured bits corresponding to the address information of the ignored OBSS PPDU is found, the AP does not take the STA as a subsequent transmission object.

In order to describe the concept of the embodiments of the present disclosure more clearly, detailed description will be given in conjunction with the accompanying drawings.

Figure 4A:
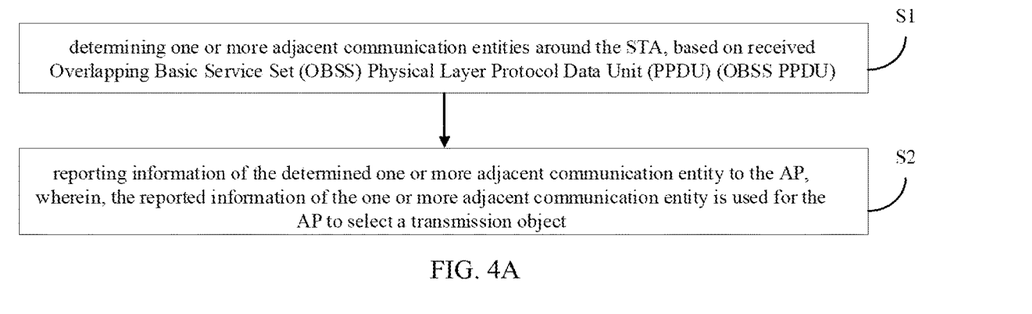
FIG. 4A is a schematic flow chart of a wireless communication method provided by an embodiment of the present disclosure.
Figure 4B:
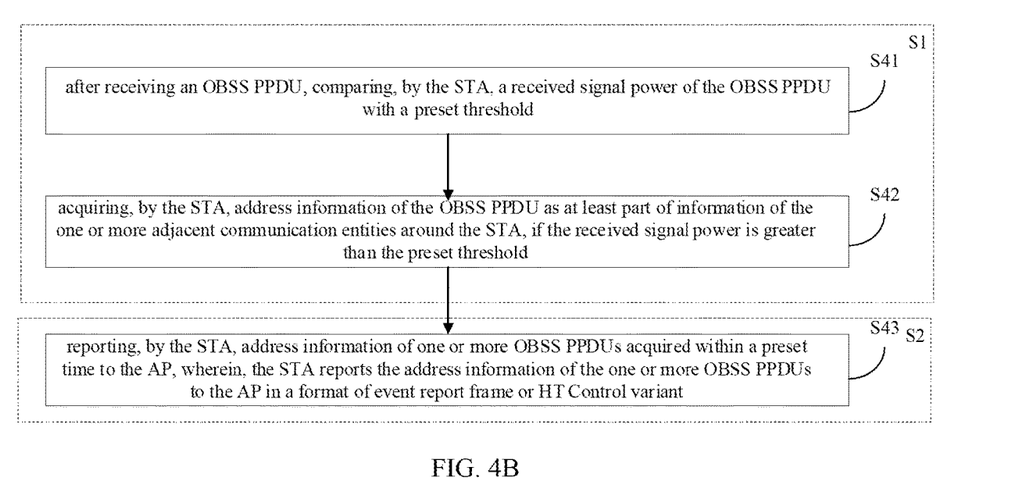
FIG. 4B is a further schematic flow chart of the wireless communication method as shown in FIG. 4A provided by the embodiment of the present disclosure.

FIG. 4A is a schematic flow chart of a wireless communication method provided by an embodiment of the present disclosure, and FIG. 4B is a further schematic flow chart of the wireless communication method as shown in FIG. 4A provided by the embodiment of the present disclosure. As shown in FIG. 4A, the wireless communication method provided by the embodiment of the present disclosure is applied at the STA and may include the following steps.

In step S1, an adjacent communication entity around the STA is determined, based on the received Overlapping Basic Service Set (OBSS) Physical Layer Protocol Data Unit (PPDU) (OBSS PPDU).

In step S2, information of the determined an adjacent communication entity is reported to the AP, wherein, the reported information of the adjacent communication entity is used for the AP to select a transmission object.

That is to say, the STA may report the information of the adjacent communication entity (or entities) thereof to the associated AP, so that in a case where transmission of the OBSS PPDU(s) from some communication entities is ignored by the AP based on spatial reuse, the AP may further select an appropriate transmission object based on the information of the communication entity (or entities) adjacent to the associated STA reported by the STA associated therewith. For example, in FIG. 3, AP2 receives an OBSS PPDU sent by STA11 to AP1, and ignores the OBSS PPDU based on spatial reuse. AP2 may select STA22 or STA23 as a transmission object for communication by considering the information of adjacent STA11 reported by its associated STA21, instead of taking STA21 as a transmission object.

Optionally, as shown in FIG. 4B, Step S1 may specifically include a sub-step S41: after receiving an OBSS PPDU, a received signal power of the OBSS PPDU is compared by the STA with a preset threshold.

Specifically, the preset threshold may be dynamically adjusted by the STA according to actual operation conditions, or may also be set to a fixed value.

The preset threshold is specifically represented as a value of the received signal power, which is taken as a reference value for comparison with a real-time received signal power of the STA according to the embodiment of the present disclosure.

In the embodiment of the present disclosure, a received signal power of each OBSS PPDU received by the STA is compared with the preset threshold, and address information of an OBSS PPDU whose received signal power is less than or equal to the preset threshold is stored without further processing.

However, the STA records address information of an OBSS PPDU whose received signal power is greater than the preset threshold. With respect to the STA, a transmitter of the OBSS PPDU whose received signal power is greater than the preset threshold may be considered as an adjacent communication entity of the STA. Each OBSS PPDU received by the STA may come from other STAs or APs.

Step S1 may further specifically include a sub-step S42: the address information of the OBSS PPDU is acquired by the STA as information of the adjacent communication entity around the STA, if the received signal power is greater than the preset threshold.

Specifically, the step of acquiring, by the STA, the address information of the OBSS PPDU, if the received signal power is greater than the preset threshold, includes: acquiring, by the STA, featured bits of the address information of the OBSS PPDU, if the received signal power is greater than the preset threshold.

The featured bits may be [39:47]th bits, adopting a last byte of a MAC address as a token.

Further, the featured bits of the address information of the OBSS PPDU whose received signal power is greater than the preset threshold is recorded, for taking the featured bits as the token of the address information of the OBSS PPDU.

Optionally, as shown in FIG. 4B, step S2 may include a sub-step S43: the address information of one or more OBSS PPDU acquired within the preset time is reported by the STA to the (STA-associated) AP. The STA reports the address information of the OBSS PPDU(s) to the AP in a format of event report frame, or, the STA reports the address information of the one or more OBSS PPDU to the AP in a format of HT Control variant.

The preset time may be adjusted according to actual needs. In the embodiment of the present disclosure, the preset time may be a recording window, and the STA reports the address information of the OBSS PPDU(s) detected within the preset time to the AP.

In the embodiment of the present disclosure, after the time during which the STA acquires the address information of the OBSS PPDU(s) reaches the preset time, the STA may, voluntarily choose to or based on system allocation, report address information of the OBSS PPDU(s) acquired within the preset time to the AP based on a format of event report frame or HT Control variant.

Figure 5:
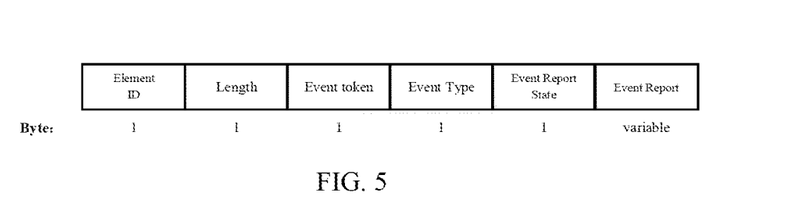
FIG. 5 is a structural schematic diagram of an event report frame provided by an embodiment of the present disclosure.

Specifically, as shown in FIG. 5, the event report frame includes: a single event report element. The single event report element at least includes: Element ID field and Event Report field.

Further, for example, the value of the Element ID field may be 79, and is used for indicating that this is an event report element.

In an optional embodiment of the present disclosure, the STA may report the address information of the OBSS PPDU(s) acquired to the AP in a format of event report frame.

Specifically, the Event Report field includes address information of the OBSS PPDU(s) acquired by the STA. For example, as described above, address information of each OBSS PPDU is represented by featured bits, so the Event Report field may include information of featured bits corresponding to address information of each OBSS PPDU.

Further, the number of pieces of information of the feature bit is at least one, so the length of the Event Report field is variable.

In an optional embodiment of the present disclosure, the Event Report field includes specific content reported by the STA to the AP, for example, includes the address information of the OBSS PPDU(s) whose received signal power is greater than the preset threshold recorded by the STA, and for further example, includes information including [39:47]th bits (i.e., the featured bits is [39:47]th bits) of these pieces of address information. That is, featured bits corresponding to address information of each OBSS PPDU may include 8 bits [39:47], so the Event Report field may include bits with a quantity of an integer multiple of 8.

Further, the event report element further includes: Length field, Event Token field, Event Type field, and Event Report Status field.

In an optional embodiment of the present disclosure, the Length field is used to indicate the number of bytes of all fields in the event report element other than element ID and length.

A value of the Event Token field is set to 0, which is used to indicate performing report automatically.

A value of the Event Type field is used to indicate a type of event report, and a value of the Event Type field may be set to any other reserved value currently specified by the protocol.

The Event Report Status field is used to indicate a response of the STA to an event request. Since according to the embodiment of the present disclosure the STA performs automatic event report, the value of the Event Report Status field is set to 0, and is used to indicate success.

In an optional embodiment of the present disclosure, the number of bytes of Element ID field, Event Report field, Length field, Event Token field, Event Type field, and Event Report Status field may all be set to 1, and the number of bytes of the Event Report field may be adjusted.

On the other hand, when the STA reports the address information of OBSS PPDU(s) acquired within the preset time to the AP based on the format of HT Control variant, the HT Control variant may include: Control ID field, Control Information field, and Padding subfield.

In an optional embodiment of the present disclosure, the STA may report the acquired address information of the OBSS PPDU(s) to the AP based on a field variant.

In an optional embodiment of the present disclosure, the STA reports information to the AP in a format of A-Control subfield of the HE variant of the HT Control field.

Figure 6:
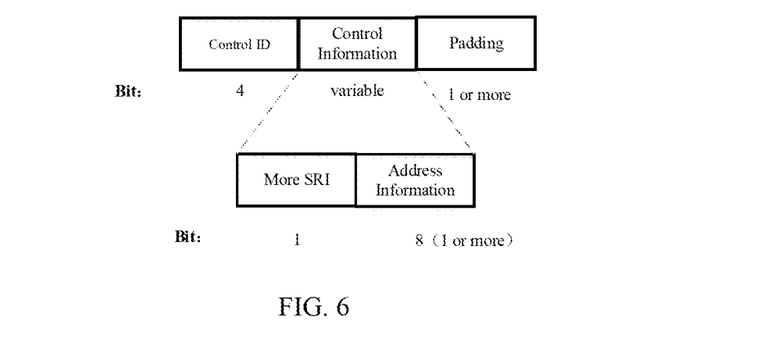
FIG. 6 is a structural schematic diagram of an A-Control variant subfield provided by an embodiment of the present disclosure.

In an optional embodiment of the present disclosure, the Control ID field is set with 4 bits, and the Padding subfield is set with 1 or more bits, and the value of the number of bits of the Control Information field is variable. The Control Information field includes a More SRI field and an address information field. The More SRI field is set with 1 bit, the address information field is set with 8 bits, and the value of the number of bits in the address information field may be adjusted.

Wherein, as shown in FIG. 6, it is an example of the A-Control Variant subfield structure. The HT Control variant (including the A-Control Variant subfield) may be transmitted in a QoS null frame, a QoS data frame, and a management frame.

In an optional embodiment of the present disclosure, the Control ID field may be set to all other reserved values currently specified in the protocol, that is, an arbitrary value from 7 to 14. The name may be a Spatial Reuse Information (SRI) Control variant.

Further, the address information field of the Control Information field includes information of featured bits of the address information.

The number of address information fields is n, and 1≤n≤3.

A first bit of the Control Information field is used to indicate whether there is still a Control Information field to be read in the information reported by the STA to the AP.

In an optional embodiment of the present disclosure, since the HT Control length is limited, it may not be possible to use a single Control Information field to include all the reported contents. Therefore, the first bit of the Control Information field is used to indicate whether there is also a subsequent Control Information field. The More SRI being 1 indicates that there is also a subsequent SRI Control variant (associated with additional Control Information field(s)), while 0 indicates that there is no subsequent SRI Control variant.

The address information field in the Control Information field includes the address information of one or more OBSS PPDUs acquired by the STA, for example, includes information including the [39:47]th bits (the featured bits) of address information of respective OBSS PPDUs whose received signal power is greater than the preset threshold recorded by the STA. Each Control Information field includes one or more address information fields, but up to three.

Further, the Padding subfield is set to a 0 sequence.

In an optional embodiment of the present disclosure, the Padding subfield is set to a 0 sequence, so that a length of the A-Control subfield carried in the HT Control field is 30 bits. The protocol specifies that the HT Control length is 32 bits. For example, with respect to the HE variant, the first two bits are used to indicate that it is the HE variant, and the following bits are fixed to 30 bits.

In an optional embodiment of the present disclosure, as described above, the AP receives another OBSS PPDU (e.g., from other AP or STA) and acquires address information of the other OBSS PPDU. When the AP ignores the received other OBSS PPDU based on the spatial reuse mechanism, the AP searches the address information of the OBSS PPDU(s) (reported by the associated STA as described above) for the address information of the other OBSS PPDU. if the address information of the other OBSS PPDU is found, then the AP will not take the STA (the associated STA that reports) as the transmission object.

In an optional embodiment of the present disclosure, for example, the AP records the address information of another OBSS PPDU as TA_SR, after receiving the address information of the other OBSS PPDU. If the AP ignores transmission of the other OBSS PPDU through spatial reuse, then the AP will check the address information of the OBSS PPDU reported by the STA associated with the AP to find the information of the [39:47]th bits of TA_SR. If there is the information of [39:47]th bits of TA_SR, the AP will not take the associated STA as an object for subsequent transmission.

That is, the AP may identify whether the associated STA is applicable to serve as a transmission object based on the information of the [39:47]th bits of TA_SR.

In an optional embodiment of the present disclosure, for example, if the STA reports the address information of the acquired OBSS PPDU(s) to the AP in the format of event report frame, the AP records the address information of another OBSS PPDU as TA_SR after receiving the address information of the other OBSS PPDU. If the AP ignores transmission of the other OBSS PPDU through spatial reuse, then the AP will check the address information of the above-described OBSS PPDU(s) reported by the STA associated therewith. If there is information of the [39:47] bits of TA_SR in the Event Report field, then the AP will not take the STA as an object for subsequent transmission.

In an optional embodiment of the present disclosure, for example, if the STA reports the address information of the acquired OBSS PPDU(s) to the AP in the format of HT Control variant, then the AP records the address information of another OBSS PPDU as TA_SR after receiving the address information of the other OBSS PPDU. If the AP ignores transmission of the other OBSS PPDU through spatial reuse, the AP will check the address information of the above-described OBSS PPDU(s) reported by the STA associated therewith. If there is information of the [39:47] bits of TA_SR in the address information field, then the AP will not take the associated STA as an object for subsequent transmission.

Figure 4C:
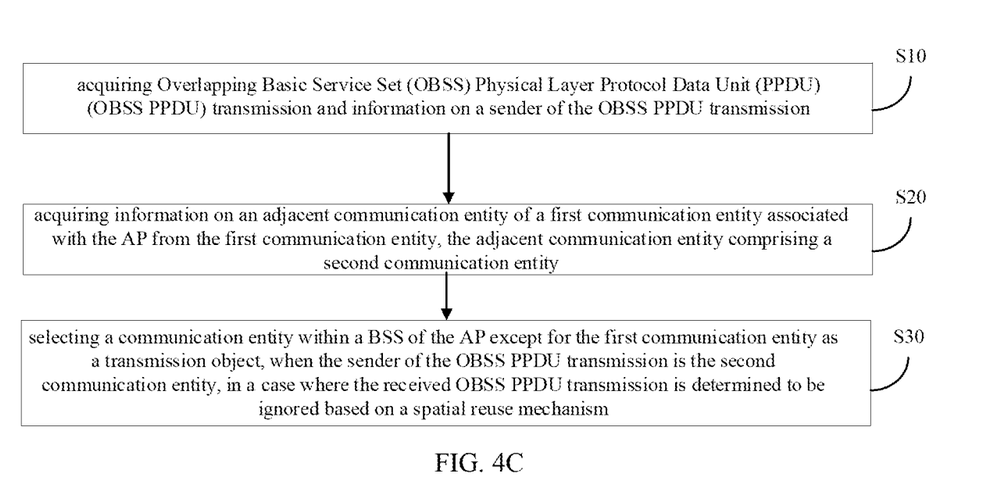
FIG. 4C is a schematic flow chart of another wireless communication method provided by an embodiment of the present disclosure.

According to the above-described process, accordingly, FIG. 4C shows a schematic flow chart of another wireless communication method provided by an embodiment of the present disclosure. The wireless communication method may be performed at the AP.

For example, as shown in FIG. 4C, in step S10, the Overlapping Basic Service Set (OBSS) Physical Layer Protocol Data Unit (PPDU) (OBSS PPDU) transmission and information on the transmitter of the OBSS PPDU transmission are acquired.

For example, OBSS PPDU transmission may come from any STA or AP, and the address of the STA or the AP can be recorded after being determined. For example, as shown in FIG. 3, AP2 may receive the OBSS PPDU sent by STA11 to AP1, so that the address of the transmitter may be determined and recorded as the address information of STA11.

In step S20, information on an adjacent communication entity of a first communication entity associated with the AP is acquired from the first communication entity, wherein the adjacent communication entity includes a second communication entity.

For example, the first communication entity, as a communication entity associated with the AP, reports information of the adjacent communication entity to the AP based on the reporting process as described above with reference to FIG. 4A to FIG. 6. The communication entity within the basic service set (BSS) of the AP may be considered as the communication entity associated with the AP. For example, as shown in FIG. 3, AP2 may receive information on the adjacent communication entity (e.g., STA11 (the second communication entity), etc.) reported by associated STA21 (or associated STA22, STA23, etc.). It should be noted that the adjacent communication entity herein does not include the communication entity within the same BSS as the first communication entity, because the adjacent communication entity is determined based on the OBSS PPDU.

In step S30, in a case where it is determined to ignore the received OBSS PPDU transmission based on the spatial reuse mechanism, when the transmitter of the OBSS PPDU transmission is the second communication entity, a communication entity within the BSS of the AP except for the first communication entity is selected for communication.

For example, as shown in FIG. 3, AP2 receives OBSS PPDU transmission sent from STA11 to AP1, and ignores the OBSS PPDU transmission through spatial reuse; since the transmitter of the OBSS PPDU transmission is STA11 (that is, the second communication entity), AP2 may select a communication entity (STA22, STA23) within the BSS of the AP2 (e.g., including STA21, STA22, STA23) except for the first communication entity (STA21) as the transmission object for communication. Therefore, blind transmission that leads to communication failure or reduced efficiency may be avoided.

Optionally, similar to the foregoing description, the information on the adjacent communication entity of the first communication entity is reported to the AP by the first communication entity in the format of event report frame or in the format of HT Control variant. The specific description has already been given above, and no details will be repeated here.

Through the embodiments of the present disclosure, during the spatial reuse mechanism, the AP may perform selective transmission based on the address information of the OBSS PPDU(s) reported by the STA associated therewith, to avoid blind transmission that leads to communication failure or reduced efficiency.

Figure 7:
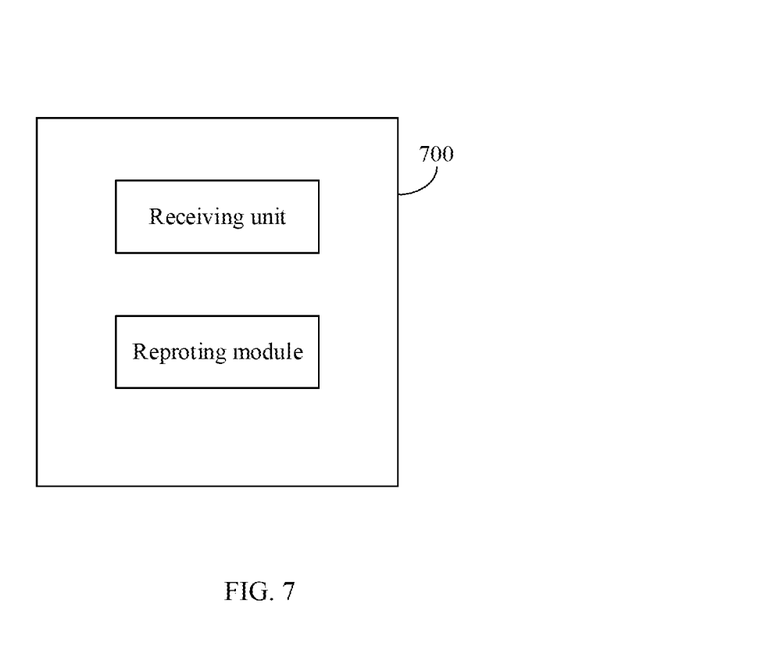
FIG. 7 is a structural schematic diagram of a wireless communication apparatus provided by an embodiment of the present disclosure.

As shown in FIG. 7, an embodiment of the present disclosure further provides a wireless communication apparatus 700, including a receiving module and a reporting module.

The receiving module is configured to determine an adjacent communication entity around the STA, based on the received Overlapping Basic Service Set (OBSS) Physical Layer Protocol Data Unit (PPDU) (OBSS PPDU).

The reporting module is configured to report information of the determined an adjacent communication entity to the AP, wherein, the reported information of the adjacent communication entity is used for the AP to select a transmission object.

Optionally, the receiving module is specifically configured to, after the STA receives an OBSS PPDU, compare a received signal power of the OBSS PPDU with a preset threshold, and if the received signal power is greater than the preset threshold, to cause the STA to acquire address information of the OBSS PPDU.

In addition, the reporting module is specifically configured such that the STA reports the address information of one or more OBSS PPDUs acquired within a preset time to the AP. The STA reports the address information of the OBSS PPDU(s) to the AP in a format of event report frame, or, the STA reports the address information of the OBSS PPDU(s) to the AP in a format of HT Control variant.

Optionally, the step of acquiring, by the STA, address information of the OBSS PPDU, if the received signal power is greater than the preset threshold, comprises: acquiring, by the STA, featured bits of the address information of the OBSS PPDU, if the received signal power is greater than the preset threshold.

Optionally, the event report frame includes: a single event report element, wherein, the single event report element at least comprises: an Element ID field and an Event Report field.

Optionally, each Event Report field includes the address information of the OBSS PPDU(s) acquired by the STA.

Optionally, the single event report element further comprises: an Length field, an Event Token field, an Event Type field, and an Event Report Status field.

Optionally, the HT Control variant comprises: a Control ID field, a Control Information field and a Padding subfield.

Optionally, a first bit of the Control Information field is used to indicate whether there is still a Control Information field to be read in the information reported by the STA to the AP.

Optionally, the address information field of the Control Information field includes the address information of the OBSS PPDU(s) acquired by the STA, where, the number n of address information fields is $1 \leq n \leq 3$.

Optionally, the Padding subfield is set to a 0 sequence.

Optionally, the AP receives another OBSS PPDU, and acquires address information of the other OBSS PPDU. When the AP ignores the received other OBSS PPDU based on the spatial reuse mechanism, the AP searches the address information of the OBSS PPDU(s) for the address information of the other OBSS PPDU, and if the address information of the other OBSS PPDU is searched, the AP will not take the STA as the transmission object.

Figure 8:
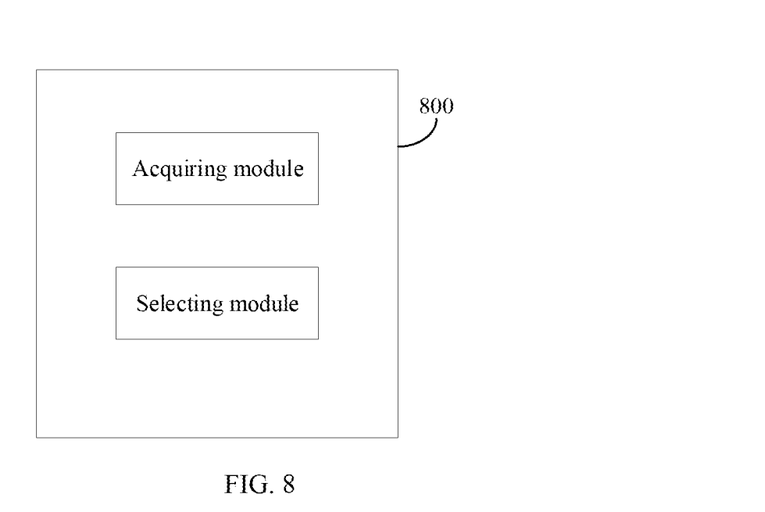
FIG. 8 is a structural schematic diagram of another wireless communication apparatus provided by an embodiment of the present disclosure.

As shown in FIG. 8, an embodiment of the present disclosure further provides another wireless communication apparatus 800, including an acquiring module and a selecting module.

The acquiring module is configured to acquire Overlapping Basic Service Set (OBSS) Physical Layer Protocol Data Unit (PPDU) (OBSS PPDU) transmission and information on a transmitter of the OBSS PPDU transmission, and acquire information on an adjacent communication entity of a first communication entity associated with the AP from the first communication entity, the adjacent communication entity comprising a second communication entity.

The selecting module is configured to select another communication entity within a Basic Service Set (BSS) of the AP except for the first communication entity as a transmission object, when the transmitter of the OBSS PPDU transmission is the second communication entity, in a case where the received OBSS PPDU transmission is determined to be ignored based on a spatial reuse mechanism.

Optionally, the information on the adjacent communication entity of the first communication entity is reported to the AP by the first communication entity in a format of event report frame or in a format of HT Control variant.

Optionally, the event report frame includes: a single event report element, wherein, the single event report element at least comprises: an Element ID field and an Event Report field, and wherein, the Event Report field comprises the address information of the adjacent communication entity of the first communication entity.

Optionally, the HT Control variant includes: a Control ID field, a Control Information field and a Padding subfield, wherein, an address information field of the Control Information field comprises the address information of the adjacent communication entity of the first communication entity.

The respective modules of the wireless communication apparatus as described with reference to FIG. 7 and FIG. 8 may be combined or each module may be further divided into more sub-modules; more details of respective modules have been described above in detail, and no details will be repeated here.

An embodiment of the present disclosure further provides an electronic device, including a processor, a memory, and computer program stored in the memory and configured to be executed by the processor, wherein, the processor, when executing the computer program, implements the method as described above.

An embodiment of the present disclosure further provides a computer readable storage medium, including computer program thereon, wherein, the computer program, when executed, controls a device where the computer readable storage medium is located to execute the method as described above.

In addition, other components and functions of the apparatus according to the embodiments of the present disclosure are known to those skilled in the art, and in order to reduce redundancy, no details will be repeated here.

It should be noted that the logic and/or steps represented in the flow chart or otherwise described here, for example, a ordered list of executable instructions that may be considered to implement logical functions, may be specifically implemented in any computer readable medium for use of instruction execution systems, apparatuses or devices (e.g., computer-based systems, systems including processors, or other systems that may fetch and execute instructions from the instruction execution systems, apparatuses, or devices), or in combination with these instruction execution systems, apparatuses, or devices. In terms of this specification, the "computer readable medium" may be any apparatus that may contain, store, communicate, propagate, or transmit programs for use by or in conjunction with instruction execution systems, apparatuses, or devices. A computer readable medium may be any non-temporary computer readable medium. More specific examples of the computer readable medium include the following (non-exhaustive list): an electrical connection part (an electronic apparatus) having one or more wirings, a portable computer cartridge (a magnetic apparatus), a Random-Access Memory (RAM), a Read-Only Memory (ROM), an Erasable Editable Read-Only Memory (EPROM or a flash memory), a fiber optic apparatus, and a Compact Disc Read-Only Memory (CDROM). In addition, the computer readable medium may even be paper or other suitable medium on which the program may be printed, as the program may be obtained electronically, for example, by optically scanning the paper or other medium, followed by editing, interpreting, or other appropriate processing as necessary, and then stored in a computer memory.

It should be understood that respective parts and/or respective modules of the present disclosure may be implemented by using hardware, software, firmware, or a combination thereof. In the above-described implementation, a plurality of steps or methods may be implemented by using software or firmware stored in a memory and executed by a suitable instruction execution system. For example, if implemented by using hardware, as in another implementation, it may be implemented by using any of the well-known techniques in the art below or a combination thereof: a discrete logic circuit having logic gates for implementing logic functions on data signals, an Application Specific Integrated Circuit (ASIC) having suitable combination of logic gates, a Programmable Gate Array (PGA), a Field Programmable Gate Array (FPGA), etc.

In the description of the present disclosure, descriptions with reference to the terms "an/the embodiment", "some embodiments", "examples", "specific examples", or "some examples", etc. mean that specific features, structures, materials or characteristics described in conjunction with the embodiment or example, are included in at least one embodiment or example of the embodiments of the present disclosure. In the present disclosure, the schematic representations of the above-described terms do not necessarily refer to the same embodiment or example. Moreover, the described specific features, structures, materials or characteristics may be combined in any one or more embodiments or examples in a suitable manner.

In the description of the present disclosure, it should be understood that directional or positional relationships shown by terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential" are directional or positional relationships shown as in the drawings, which only means to facilitate description of the present disclosure and simplify the description, but do not indicate or imply that the apparatuses or components must have specific directions, or be constructed or operated in the specific directions, and are not limitative of the present disclosure.

In addition, the terms "first" and "second" are only used for description purposes, and cannot be understood as indicating or implying relative importance or implicitly indicating the number of indicated technical features. Thus, a feature defined as "first" or "second" may expressly or implicitly indicate that one or more that features are included. In the description of the present disclosure, "a plurality of" refers to at least two, for example, two, three, etc., unless otherwise specifically defined.

In the description of the embodiments of the present disclosure, unless otherwise unambiguously specified and defined, terms like "mounting", "coupling" and "connecting" and "fixing" should be construed in its broad sense, for example, it may be fixed connection, or detachable connection, or integral connection; or may also be mechanical connection or electrical connection; or may also be direct connection, or may also be indirect connection through an intermediate medium; or may also be internal communication between two components or interaction relationship between two components, unless otherwise specified. It will be understood by those ordinarily skilled in the art that the specific meanings of the above terms vary in different contexts.

In the present disclosure, unless otherwise explicitly specified and limited, a first feature being located "above" or "below" a second feature may include the first feature and the second feature being in direct contact with each other, or may also include the first feature and the second feature being in indirect contact through an intermediate medium. Moreover, the first feature being "on", "above", and "over" the second feature includes the first feature being directly above and diagonally above the second feature, or simply indicates that the first feature is horizontally higher than the second feature. The first feature being "below", "under" and "beneath" the second feature includes the first feature being directly below and diagonally below the second feature, or simply indicates that the first feature is horizontally lower than the second feature.

Although the embodiments of the present disclosure have been shown and described above, it may be understood that the above-described embodiments are exemplary and cannot be understood as limitations on the present disclosure; those ordinarily skilled in the art may make changes, modifications, replacements and variations to the above-described embodiments within the scope of the present disclosure.

The invention claimed is:

1. A wireless communication method applied to a Station (STA), comprising:
   determining an adjacent communication entity around the STA, based on received Overlapping Basic Service Set (OBSS) Physical Layer Protocol Data Unit (PPDU) (OBSS PPDU), wherein the adjacent communication entity is not within a same Basic Service Set BSS) as the STA; and
   reporting information of the determined adjacent communication entity to an access point (AP), wherein, the reported information of the adjacent communication entity is used for the AP to select a transmission object within a Basic Service Set (BSS) of the AP.

2. The wireless communication method according to claim 1, wherein, the step of determining an adjacent communication entity around the STA based on received OBSS PPDU, comprises:
   after receiving an OBSS PPDU, comparing, by the STA, a received signal power of the OBSS PPDU with a preset threshold; and
   acquiring, by the STA, address information of the OBSS PPDU as information of the adjacent communication entity around the STA, if the received signal power is greater than the preset threshold.

3. The wireless communication method according to claim 2, wherein, the step of reporting the information of the determined adjacent communication entity to the AP, comprises:
   reporting, by the STA, address information of OBSS PPDU(s) acquired within a preset time to the AP,
   wherein, the STA reports the address information of the OBSS PPDU(s) to the AP in a format of event report frame, or, the STA reports the address information of the OBSS PPDU(s) to the AP in a format of HT Control variant.

4. The wireless communication method according to claim 3, wherein, the step of acquiring, by the STA, address information of the OBSS PPDU, if the received signal power is greater than the preset threshold, comprises:
   acquiring, by the STA, featured bits of the address information of the OBSS PPDU, if the received signal power is greater than the preset threshold.

5. The wireless communication method according to claim 3, wherein, the event report frame comprises:
   a single event report element;
   wherein, the single event report element at least comprises: an Element ID field and an Event Report field.

6. The wireless communication method according to claim 5, wherein, the Event Report field comprises the address information of the OBSS PPDU(s) acquired by the STA.

7. The wireless communication method according to claim 5, wherein, the single event report element further comprises: a Length field, an Event Token field, an Event Type field, and an Event Report Status field.

8. The wireless communication method according to claim 3, wherein, the HT Control variant comprises:
   a Control ID field, a Control Information field and a Padding subfield.

9. The wireless communication method according to claim 8, wherein, a first bit of the Control Information field is used to indicate whether there is still a Control Information field to be read in the information reported by the STA to the AP.

10. The wireless communication method according to claim 8, wherein, an address information field of the Control Information field comprises the address information of the OBSS PPDU(s) acquired by the STA,
    where, the number n of address information fields is 1≤n≤3.

11. The wireless communication method according to claim 8, wherein, the Padding subfield is set to a 0 sequence.

12. The wireless communication method according to claim 3, wherein, the AP receives another OBSS PPDU, and acquires address information of the other OBSS PPDU;
   when the AP ignores the received other OBSS PPDU based on the spatial reuse mechanism, the AP searches the address information of the OBSS PPDU(s) for the address information of the other OBSS PPDU;
   if the address information of the other OBSS PPDU is searched, the AP will not take the STA as the transmission object.

13. An electronic device, comprising a processor, a memory, and computer program stored in the memory and configured to be executed by the processor, wherein, the processor, when executing the computer program, implements the wireless communication method according to claim 1.

14. A computer readable storage medium, comprising computer program stored thereon, wherein, the computer program, when executed, controls a device where the computer readable storage medium is located to execute the wireless communication method according to claim 1.

15. A wireless communication method applied to an Access Point (AP), comprising:
   acquiring Overlapping Basic Service Set (OBSS) Physical Layer Protocol Data Unit (PPDU) (OBSS PPDU) transmission and information on a transmitter of the OBSS PPDU transmission;
   acquiring information on an adjacent communication entity of a first communication entity associated with the AP from the first communication entity, the adjacent communication entity comprising a second communication entity and is not within a same Basic Service Set (BSS) as the first communication entity; and
   selecting a communication entity within a Basic Service Set (BSS) of the AP except for the first communication entity as a transmission object, when the transmitter of the OBSS PPDU transmission is the second communication entity, in a case where the received OBSS PPDU transmission is determined to be ignored based on a spatial reuse mechanism.

16. The wireless communication method according to claim 15, wherein, the information on the adjacent communication entity of the first communication entity is reported to the AP by the first communication entity in a format of event report frame or in a format of HT Control variant.

17. The wireless communication method according to claim 16, wherein, the event report frame comprises:
   a single event report element,
   wherein, the single event report element at least comprises: an Element ID field and an Event Report field,
   wherein, the Event Report field comprises the address information of the adjacent communication entity of the first communication entity.

18. The wireless communication method according to claim 16, wherein, the HT Control variant comprises:
   a Control ID field, a Control Information field and a Padding subfield, wherein, an address information field of the Control Information field comprises the address information of the adjacent communication entity of the first communication entity.

19. An electronic device, comprising a processor, a memory, and computer program stored in the memory and configured to be executed by the processor, wherein, the processor, when executing the computer program, implements the wireless communication method according to claim 15.

20. A computer readable storage medium, comprising computer program stored thereon, wherein, the computer program, when executed, controls a device where the computer readable storage medium is located to execute the wireless communication method according to claim 15.

* * * * *